United States Patent
Kang et al.

(10) Patent No.: US 12,524,106 B2
(45) Date of Patent: Jan. 13, 2026

(54) ELECTRONIC DEVICE

(71) Applicant: Samsung Display Co., Ltd., Yongin-si (KR)

(72) Inventors: Bongil Kang, Yongin-si (KR); Min-Hong Kim, Yongin-si (KR); Sangkook Kim, Yongin-si (KR); Taejoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/976,172

(22) Filed: Dec. 10, 2024

(65) Prior Publication Data

US 2025/0224828 A1    Jul. 10, 2025

(30) Foreign Application Priority Data

Jan. 8, 2024   (KR) .................. 10-2024-0002992

(51) Int. Cl.
*G06F 3/041*   (2006.01)

(52) U.S. Cl.
CPC .............. *G06F 3/04164* (2019.05)

(58) Field of Classification Search
None
See application file for complete search history.

(56) References Cited

U.S. PATENT DOCUMENTS

| | | | |
|---|---|---|---|
| 9,207,818 B2 | 12/2015 | Kang et al. | |
| 9,335,881 B2 | 5/2016 | Jeong | |
| 9,904,420 B2 * | 2/2018 | Kim | G06F 3/04166 |
| 2021/0117047 A1 * | 4/2021 | Cho | G06F 3/0446 |
| 2022/0004281 A1 * | 1/2022 | Hyun | G06F 3/0446 |
| 2022/0083192 A1 | 3/2022 | Kim et al. | |
| 2022/0164083 A1 * | 5/2022 | Lee | G06F 3/0446 |
| 2023/0094957 A1 | 3/2023 | Lee et al. | |
| 2023/0118014 A1 | 4/2023 | Lee et al. | |

FOREIGN PATENT DOCUMENTS

| | | |
|---|---|---|
| KR | 10-2014-0064259 A | 5/2014 |
| KR | 10-1941255 B1 | 1/2019 |
| KR | 10-2022-0036419 A | 3/2022 |
| KR | 10-2023-0045734 A | 4/2023 |
| KR | 10-2023-0055320 A | 4/2023 |

* cited by examiner

*Primary Examiner* — Krishna P Neupane
(74) *Attorney, Agent, or Firm* — Womble Bond Dickinson (US) LLP

(57) ABSTRACT

Disclosed is an electronic device including a display layer, a sensor layer above the display layer, and defining a sensing area including a first area and a second area, and a sensor driver configured to drive the sensor layer, wherein the sensor layer includes a (1-1)th electrode in the first area, and extending in a first direction, a (2-1)th electrode in the first area, extending in a second direction crossing the first direction, and insulated from and crossing the (1-1)th electrode, a (1-2)th electrode in the second area, and extending in the second direction, a (2-2)th electrode in the second area, extending in the first direction, and insulated from and crossing the (1-2)th electrode, a first line connected to the (1-1)th electrode and to the (1-2)th electrode, a (2-1)th line connected to the (2-1)th electrode, and a (2-2)th line connected to the (2-2)th electrode.

20 Claims, 11 Drawing Sheets

ELECTRONIC DEVICE

CROSS-REFERENCE TO RELATED APPLICATION

The present application claims priority to, and the benefit of, Korean Patent Application No. 10-2024-0002992, filed on Jan. 8, 2024, in the Korean Intellectual Property Office, the entire disclosure of which is incorporated herein by reference.

BACKGROUND

1. Field

Embodiments of the present disclosure described herein relate to an electronic device having improved touch reliability.

2. Description of the Related Art

Multimedia electronic devices, such as a television (TV), a mobile phone, a tablet computer, a navigation system, or a game console, include electronic devices for displaying images. Electronic devices may include, in addition to a general input manner, such as a button, a keyboard, and a mouse, an input sensor capable of providing a touch-based input manner that allows a user to input information or commands effectively and intuitively.

SUMMARY

Embodiments of the present disclosure provide an electronic device having improved touch reliability.

According to one or more embodiments, an electronic device includes a display layer, a sensor layer above the display layer, and defining a sensing area including a first area and a second area, and a sensor driver configured to drive the sensor layer, wherein the sensor layer includes a $(1\text{-}1)^{th}$ electrode in the first area, and extending in a first direction, a $(2\text{-}1)^{th}$ electrode in the first area, extending in a second direction crossing the first direction, and insulated from and crossing the $(1\text{-}1)^{th}$ electrode, a $(1\text{-}2)^{th}$ electrode in the second area, and extending in the second direction, a $(2\text{-}2)^{th}$ electrode in the second area, extending in the first direction, and insulated from and crossing the $(1\text{-}2)^{th}$ electrode, a first line connected to the $(1\text{-}1)^{th}$ electrode and to the $(1\text{-}2)^{th}$ electrode, a $(2\text{-}1)^{th}$ line connected to the $(2\text{-}1)^{th}$ electrode, and a $(2\text{-}2)^{th}$ line connected to the $(2\text{-}2)^{th}$ electrode.

The sensing area may further include a boundary area between the first area and the second area, wherein the sensor layer further includes a guard electrode in the boundary area.

The guard electrode may be configured to receive a ground voltage.

The guard electrode may be configured to be in a floating state.

The guard electrode may be at a same layer as the $(1\text{-}1)^{th}$ electrode.

The guard electrode may include a first sub-guard and a second sub-guard arranged in the first direction, and extending in the second direction.

The first sub-guard and the second sub-guard may be configured to receive different respective voltage levels.

The guard electrode may further include a third sub-guard spaced from the first sub-guard with the second sub-guard therebetween.

The first sub-guard and the third sub-guard may be configured to receive a voltage that is different from a voltage configured to be received by the second sub-guard.

The first line, the $(2\text{-}1)^{th}$ line, and the $(2\text{-}2)^{th}$ line may be electrically connected to the sensor driver.

A size of the $(1\text{-}1)^{th}$ electrode may be different from a size of the $(1\text{-}2)^{th}$ electrode.

The sensor driver may be configured to provide a same sensing signal to the $(1\text{-}1)^{th}$ electrode and the $(1\text{-}2)^{th}$ electrode through the first line.

The $(1\text{-}1)^{th}$ electrode and the $(1\text{-}2)^{th}$ electrode may be electrically connected.

According to one or more embodiments, an electronic device includes a display layer, a sensor layer above the display layer, and defining a sensing area including a first area and a second area, and a sensor driver configured to drive the sensor layer, wherein the sensor layer includes $(1\text{-}1)^{th}$ electrodes in the first area, extending in a first direction, and arranged in a second direction crossing the first direction, $(2\text{-}1)^{th}$ electrodes in the first area, extending in the second direction, and arranged in the first direction, $(1\text{-}2)^{th}$ electrodes in the second area, extending in the second direction, and arranged in the first direction, and $(2\text{-}2)^{th}$ electrodes in the second area, extending in the first direction, and arranged in the second direction, and wherein the sensor driver is configured to provide a same sensing signal to a first $(1\text{-}1)^{th}$ electrode of the $(1\text{-}1)^{th}$ electrodes and a first $(1\text{-}2)^{th}$ electrode of the $(1\text{-}2)^{th}$ electrodes.

A number of the $(1\text{-}1)^{th}$ electrodes and a number of the $(1\text{-}2)^{th}$ electrodes may be equal.

The sensing area may further include a boundary area between the first area and the second area, wherein the sensor layer further includes a guard electrode in the boundary area.

The guard electrode may be configured to receive a ground voltage.

The guard electrode may be configured to be in a floating state.

The $(1\text{-}1)^{th}$ electrodes and the $(1\text{-}2)^{th}$ electrodes may be electrically connected.

A size of the first $(1\text{-}1)^{th}$ electrode may be different from a size of the first $(1\text{-}2)^{th}$ electrode.

BRIEF DESCRIPTION OF THE DRAWINGS

The above and other aspects of the present disclosure will become apparent by describing in detail embodiments thereof with reference to the accompanying drawings.

DETAILED DESCRIPTION

Figure 1:
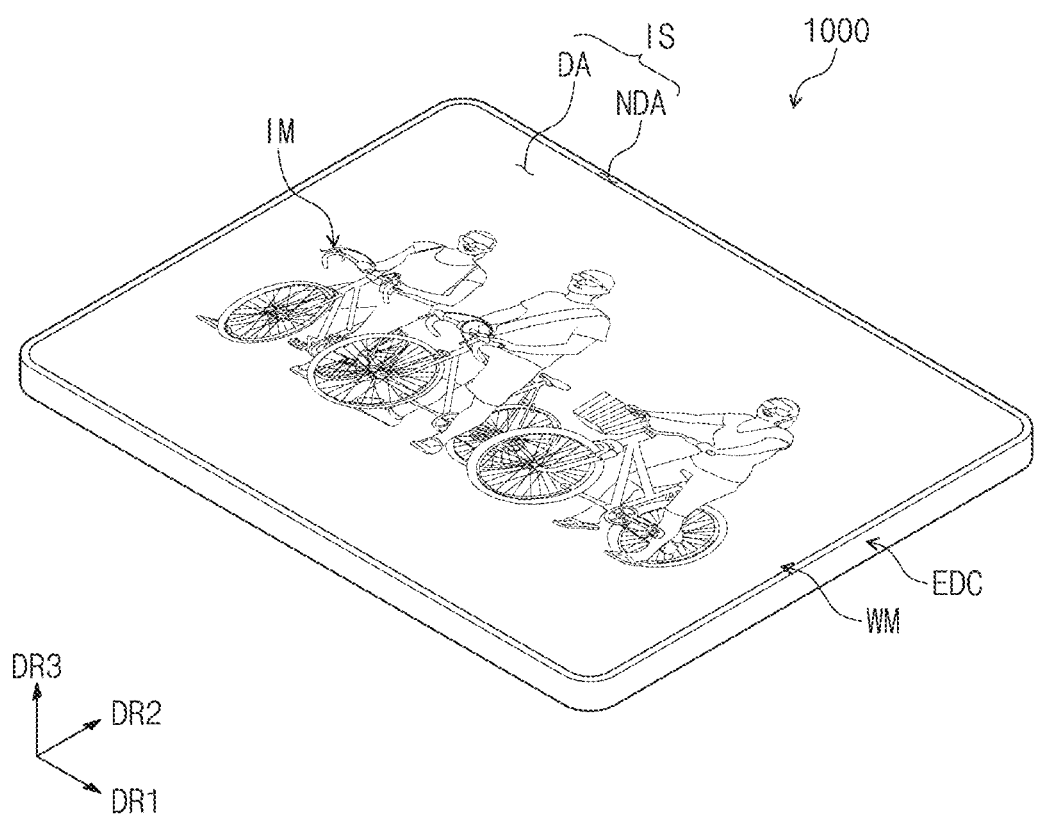
FIG. 1 is a perspective view of an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
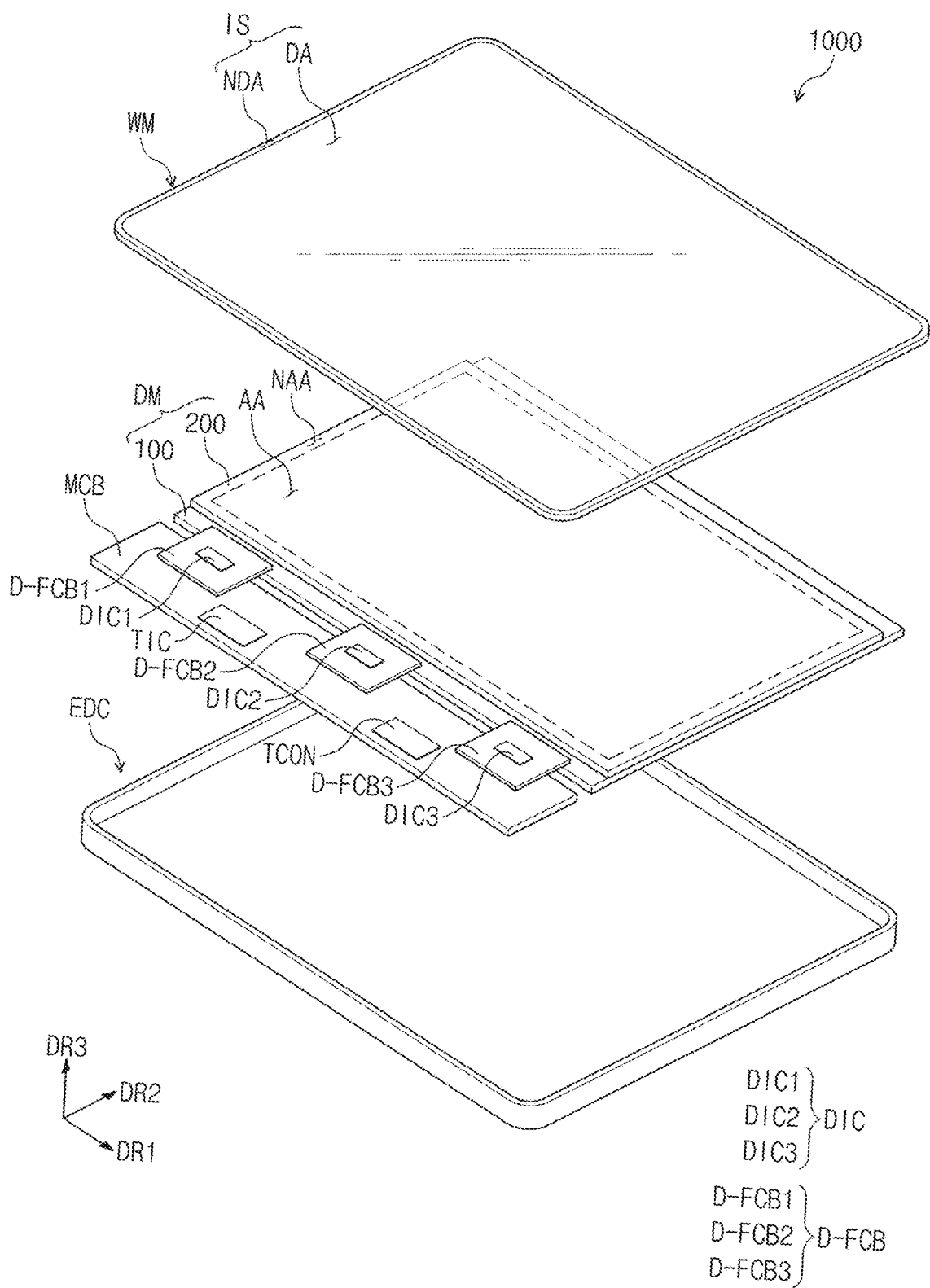
FIG. 2 is an exploded perspective view of the electronic device according to one or more embodiments of the present disclosure.

FIG. 1 is a perspective view of an electronic device according to one or more embodiments of the present disclosure, and FIG. 2 is an exploded perspective view of the electronic device according to one or more embodiments of the present disclosure.

Referring to FIGS. 1 and 2, an electronic device 1000 may be a device that is activated according to an electric signal. The electronic device 1000 according to the present disclosure may be large-sized electronic devices, such as a television and a monitor, as well as small- or medium-sized electronic devices, such as mobile phones, tablet computers, laptop computers, vehicle navigation systems, vehicle dashboards, and game consoles. These are merely presented as examples, and the electronic device 1000 may include other types of electronic devices as long as the electronic devices do not deviate from the concept of the present disclosure. The electronic device 1000 may have a rectangular shape having long sides in a first direction DR1, and short sides in a second direction DR2 crossing the first direction DR1. However, the shape of the electronic device 1000 is not limited thereto, and the electronic devices 1000 having various shapes may be provided. The electronic device 1000 may display an image IM in a third direction DR3 on a display surface IS that is substantially parallel to the first direction DR1 and the second direction DR2. The third direction DR3 may cross the first direction DR1 and the second direction DR2. The display surface IS on which the image IM is displayed may correspond to a front surface of the electronic device 1000.

In one or more embodiments, a front surface (or an upper surface) and a rear surface (or a lower surface) of each member may be defined with respect to a direction in which the image IM is displayed. The front surface and the rear surface may be opposite to each other in the third direction DR3, and a normal direction of each of the front surface and the rear surface may be substantially parallel to the third direction DR3.

A separation distance between the front surface and the rear surface in the third direction DR3 may correspond to a thickness of the electronic device 1000 in the third direction DR3. Meanwhile, directions indicated by the first to third directions DR1, DR2, and DR3 are relative concepts, and may be changed to other directions.

The electronic device 1000 may sense an external input applied from the outside. The external input may include various types of inputs provided from the outside of the electronic device 1000. The electronic device 1000 according to one or more embodiments of the present disclosure may sense an external input of a user, which is applied from the outside. The external input of the user may be any one or combinations of various types of external inputs, such as a portion of a body of a user, light, heat, gaze, or pressure. Further, the electronic device 1000 may sense the external input of the user applied to a side surface or rear surface of the electronic device 1000 according to a structure of the electronic device 1000, and the present disclosure is not limited to one or more embodiments. As an example of the present disclosure, the external input may include an input by an input device (for example, a stylus pen, an active pen, a touch pen, an electronic pen, an e-pen, or the like).

The display surface IS of the electronic device 1000 may be divided into a display area DA and a non-display area NDA. The display area DA may be an area on which the image IM is displayed. The user may visually recognize the image IM through the display area DA. In one or more embodiments, the display area DA has a quadrangular shape having rounded vertexes. However, this is illustratively illustrated, the display area DA may have various shapes, and the present disclosure is not limited to one or more embodiments.

The non-display area NDA may be adjacent to the display area DA. The non-display area NDA may have a color (e.g., predetermined color). The non-display area NDA may surround the display area DA (e.g., in plan view). Accordingly, a shape of the display area DA may be substantially defined by the non-display area NDA. However, this is only an example, and the non-display area NDA may be located adjacent to only one side of the display area DA or may be omitted. The electronic device 1000 according to one or more embodiments of the present disclosure may include various embodiments and is not limited to one or more embodiments.

The electronic device 1000 may include a display module DM, a main circuit board MCB, flexible circuit films D-FCB, a plurality of data-driving circuits DIC, and a window WM.

The display module DM may include a display layer 100 and a sensor layer 200.

The display layer 100 according to one or more embodiments of the present disclosure may be a light-emitting display panel. As an example, the display layer 100 may be an organic light-emitting display layer, an inorganic light-emitting display layer, or a quantum dot light-emitting display layer. A light-emitting layer of the organic light-emitting display layer may include an organic light-emitting material. A light-emitting layer of the inorganic light-emitting display layer may include an inorganic light-emitting material. For example, the light-emitting layer of the inorganic light-emitting display layer may include micro light-emitting diodes (LEDs) or nano LEDs. A light-emitting layer of the quantum dot light-emitting display layer may include a quantum dot, a quantum rod, or the like. Hereinafter, in one or more embodiments, the display layer 100 will be described as an organic light-emitting display panel.

The display layer 100 may output the image IM, and the output image IM may be displayed through the display surface IS.

The sensor layer 200 may sense an external input. The sensor layer 200 may be located on the display layer 100. For example, the sensor layer 200 may be directly located on the display layer 100.

The window WM may be made of a transparent material through which the image IM may be output. For example, the window WM may be made of glass, sapphire, plastic, or the like. The window WM is illustrated as a single layer, but the present disclosure is not limited thereto, and the window WM may include a plurality of layers.

In one or more embodiments, the window WM may include a light-shielding pattern for defining the non-display area NDA. The light-shielding pattern may be a colored organic film and may be formed, for example, by a coating method.

The window WM may be coupled to the display module DM through an adhesive film. As an example of the present disclosure, the adhesive film may include an optically clear adhesive (OCA) film. However, the adhesive film is not limited thereto, and may include a general adhesive or bonding agent. For example, the adhesive film may include an optically clear resin (OCR) or a pressure-sensitive adhesive (PSA) film.

The display module DM may display the image IM according to an electrical signal. The display module DM may be defined by an active area AA and a non-active area NAA. The active area AA may be defined as an area that outputs the image IM provided from the display module DM.

The non-active area NAA may be adjacent to the active area AA. For example, the non-active area NAA may surround the active area AA. However, this is illustratively illustrated, the non-active area NAA may be defined in various shapes, and the present disclosure is not limited to one or more embodiments. According to one or more embodiments, the active area AA of the display module DM may correspond to at least a portion of the display area DA.

The main circuit board MCB may be connected to the flexible circuit films D-FCB, and may be electrically connected to the display module DM. The flexible circuit films D-FCB may be connected to the display module DM, and may be electrically connect the display module DM and the main circuit board MCB.

The main circuit board MCB may include a sensor driver (e.g., a sensor-driving unit) TIC and a timing controller TCON. The sensor driver TIC may include circuits for driving the display module DM. The plurality of data-driving circuits DIC may be mounted on the flexible circuit films D-FCB.

As an example of the present disclosure, the flexible circuit films D-FCB may include a first flexible circuit film D-FCB1, a second flexible circuit film D-FCB2, and a third flexible circuit film D-FCB3. The plurality of data-driving circuits DIC may include a first data-driving circuit DIC1, a second data-driving circuit DIC2, and a third data-driving circuit DIC3. The first to third flexible circuit films D-FCB1, D-FCB2, and D-FCB3 may be spaced apart from each other in the first direction DR1, and may electrically connect the display module DM and the main circuit board MCB. The first data-driving circuit DIC1 may be mounted on the first flexible circuit film D-FCB1. The second data-driving circuit DIC2 may be mounted on the second flexible circuit film D-FCB2. The third data-driving circuit DIC3 may be mounted on the third flexible circuit film D-FCB3. However, one or more embodiments of the present disclosure is not limited thereto. For example, the display module DM may be electrically connected to the main circuit board MCB through one flexible circuit film, and a single driving chip may be mounted on the one flexible circuit film. Further, the display module DM may be electrically connected to the main circuit board MCB through four or more flexible circuit films, and the driving chips may be mounted on the flexible circuit films, respectively.

FIG. 2 illustrates a structure in which the first to third data-driving circuits DIC1, DIC2, and DIC3 are mounted on the first to third flexible circuit films D-FCB1, D-FCB2, and D-FCB3, respectively, but the present disclosure is not limited thereto. For example, the first to third data-driving circuits DIC1, DIC2, and DIC3 may be directly mounted on the display module DM. In this case, a portion of the display module DM, on which the first to third data-driving circuits DIC1, DIC2, and DIC3 are mounted, may be bent to be adjacent or on a rear surface of the display module DM. Further, the first to third data-driving circuits DIC1, DIC2, and DIC3 may be directly mounted on the main circuit board MCB.

The electronic device 1000 may further include an external case EDC that accommodates the display module DM. The external case EDC may be coupled to the window WM, and may define an external appearance of the electronic device 1000. The external case EDC may absorb an impact applied from the outside, may reduce or prevent penetration of foreign substances, moisture, or the like into the display module DM, and thus may protect components accommodated in the external case EDC. Meanwhile, as an example of the present disclosure, the external case EDC may be provided in a form in which a plurality of accommodation members are coupled.

The electronic device 1000 according to one or more embodiments may further include an electronic module including various functional modules for operating the display module DM, a power supply module (for example, a battery) that supplies power suitable for the overall operation of the electronic device 1000, a bracket that is coupled to the display module DM and/or the external case EDC and that divides an inner space of the electronic device 1000, and/or the like.

Figure 3:
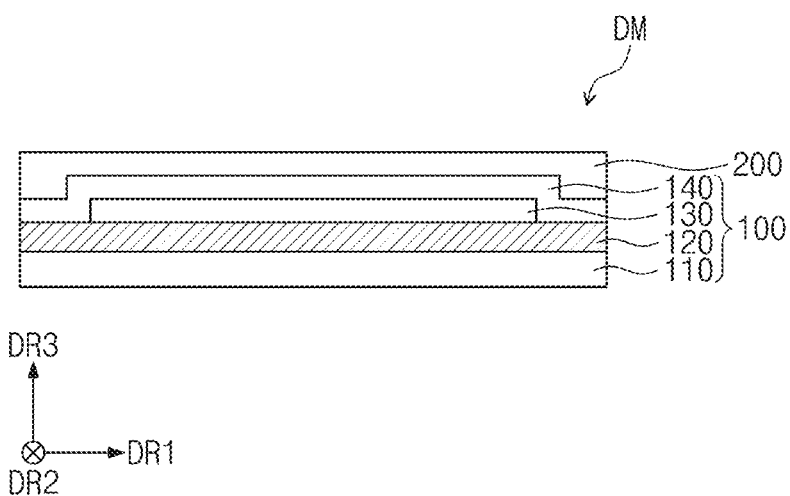
FIG. 3 is a schematic cross-sectional view of a display module according to one or more embodiments of the present disclosure.

FIG. 3 is a schematic cross-sectional view of a display module according to one or more embodiments of the present disclosure.

Referring to FIG. 3, the display module DM may include the display layer 100 and the sensor layer 200.

The display layer 100 may be a component that substantially generates an image. The display layer 100 may be a light-emitting display layer. For example, the display layer 100 may be an organic light-emitting display layer, an inorganic light-emitting display layer, an organic-inorganic light-emitting display layer, a quantum dot display layer, a micro-LED display layer, or a nano-LED display layer. The display layer 100 may include a base layer 110, a circuit layer 120, a light-emitting element layer 130, and an encapsulation layer 140.

The base layer 110 may be a member that provides a base surface on which the circuit layer 120 is located. The base layer 110 may have a multi-layer structure or a single-layer structure. The base layer 110 may be a glass substrate, a metal substrate, a silicon substrate, a polymer substrate or the like, but the present disclosure is not limited thereto.

The circuit layer 120 may be located on the base layer 110. The circuit layer 120 may include an insulating layer, a semiconductor pattern, a conductive pattern, a signal line, and the like. The insulating layer, a semiconductor layer, and a conductive layer are formed on the base layer 110 in a manner, such as coating and deposition, and the insulating layer, the semiconductor layer, and the conductive layer may be selectively patterned through a plurality of photolithography processes.

The light-emitting element layer 130 may be located on the circuit layer 120. The light-emitting element layer 130 may include a light-emitting element. For example, the light-emitting element layer 130 may include an organic light-emitting material, an inorganic light-emitting material, an organic-inorganic light-emitting material, a quantum dot, a quantum rod, a micro-LED, or a nano-LED.

The encapsulation layer 140 may be located on the light-emitting element layer 130. The encapsulation layer 140 may protect the light-emitting element layer 130 from moisture, oxygen, and foreign substances, such as dust particles.

The sensor layer 200 may be located on the display layer 100. The sensor layer 200 may sense an external input applied from an external unit. The sensor layer 200 may be an integrated sensor formed continuously during a process of manufacturing the display layer 100, or the sensor layer 200 may be an external sensor attached to the display layer 100. The sensor layer 200 may be referred to as a sensor, an input-sensing layer, an input-sensing panel, an electronic device for sensing input coordinates or the like.

According to one or more embodiments of the present disclosure, the sensor layer 200 may sense both input from a passive input means, such as the body of the user, and an input device that generates a magnetic field having a resonant frequency (e.g., predetermined resonant frequency). The input device may be referred to as a pen, an input pen, a magnetic pen, a stylus pen, or electromagnetic resonance pen.

Figure 4:
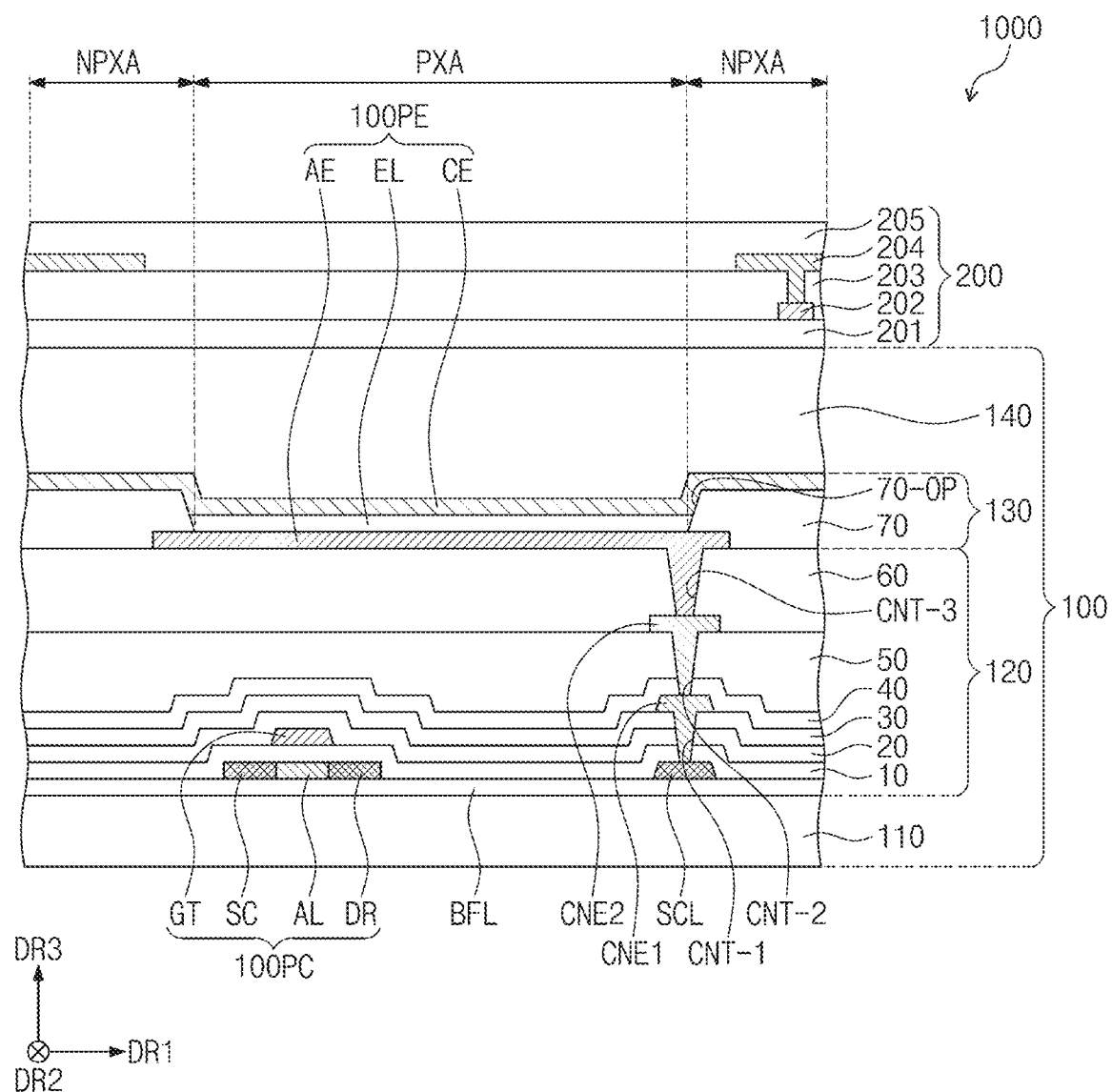
FIG. 4 is a cross-sectional view of the electronic device according to one or more embodiments of the present disclosure.

FIG. 4 is a cross-sectional view of the electronic device according to one or more embodiments of the present disclosure.

Referring to FIG. 4, at least one inorganic layer is formed on an upper surface of the base layer 110. The inorganic layer may include at least one of aluminum oxide, titanium oxide, silicon oxide, silicon nitride, silicon oxy nitride, zirconium oxide, or hafnium oxide. The inorganic layer may be formed in multiple layers. The multi-layered inorganic layers may constitute a barrier layer and/or a buffer layer. In one or more embodiments, it is illustrated that the display layer 100 includes a buffer layer BFL.

The buffer layer BFL may improve a bonding force between the base layer 110 and the semiconductor pattern. The buffer layer BFL may include at least one of silicon oxide, silicon nitride, or silicon oxy nitride. For example, the buffer layer BFL may include a structure in which silicon oxide layers and silicon nitride layers are alternately laminated.

The semiconductor pattern may be located on the buffer layer BFL (as used herein, "located on" may mean "above"). The semiconductor pattern may include poly silicon. However, the present disclosure is not limited thereto, and the semiconductor pattern may include amorphous silicon, low-temperature polycrystalline silicon, or an oxide semiconductor.

FIG. 4 merely illustrates a portion of the semiconductor pattern, and the semiconductor pattern may be further located in another area. The semiconductor pattern may be located in a corresponding rule across the pixels. The semiconductor pattern may have a different electrical property depending on whether or not the semiconductor pattern is doped. The semiconductor pattern may include a first area having higher conductivity and a second area having lower conductivity. The first area may be doped with an N-type dopant or a P-type dopant. A P-type transistor may include a doped area doped with the P-type dopant, and an N-type transistor may include a doped area doped with the N-type dopant. The second area may be a non-doping area, or may be an area doped at a concentration that is lower than a concentration of the first area.

A conductivity of the first area is greater than a conductivity of the second area, and the first area may substantially serve as an electrode or a signal wiring line. The second area may substantially correspond to an active area (or a channel) of a transistor. In other words, a portion of the semiconductor pattern may be an active area of the transistor, another portion of the semiconductor pattern may be a source area or a drain area of the transistor, and still another portion of the semiconductor pattern may be a connection electrode or a connection signal wiring line.

Each of pixels may have an equivalent circuit including seven transistors, one capacitor, and a light-emitting element, and the equivalent circuit of the pixel may be modified into various forms. FIG. 4 illustrates one transistor 100PC and one light-emitting element 100PE included in the pixel.

A source area SC, an active area AL, and a drain area DR of the transistor 100PC may be formed from the semiconductor pattern. The source area SC and the drain area DR may respectively extend from the active area AL in opposite directions on a cross section. FIG. 4 illustrates a portion of a connection signal wiring line SCL formed from the semiconductor pattern. In one or more embodiments, the connection signal wiring line SCL may be connected to the drain area DR of the transistor 100PC on a plane.

A first insulating layer 10 may be located on the buffer layer BFL. The first insulating layer 10 may commonly overlap the plurality of pixels, and may cover the semiconductor pattern. The first insulating layer 10 may be an inorganic layer and/or an organic layer, and may have a single-layer structure or a multi-layer structure. The first insulating layer 10 may include at least one of aluminum oxide, titanium oxide, silicon oxide, silicon nitride, silicon oxy nitride, zirconium oxide, or hafnium oxide. In one or more embodiments, the first insulating layer 10 may be a single-layer silicon oxide layer. The first insulating layer 10 and an insulating layer of the circuit layer 120, which will be described below, may be an inorganic layer and/or an organic layer, and may have a single-layer structure or a multi-layer structure. The inorganic layer may include at least one of the above-described materials, but the present disclosure is not limited thereto.

A gate GT of the transistor 100PC is located on the first insulating layer 10. The gate GT may be a portion of a metal pattern. The gate GT overlaps the active area AL. The gate GT may function as a mask in a process of doping the semiconductor pattern.

A second insulating layer 20 may be located on the first insulating layer 10, and may cover the gate GT. The second insulating layer 20 may commonly overlap the pixels. The second insulating layer 20 may be an inorganic layer and/or an organic layer, and may have a single-layer structure or a multi-layer structure. The second insulating layer 20 may include at least one of silicon oxide, silicon nitride, or silicon oxy nitride. In one or more embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to the connection signal wiring line SCL through a contact hole CNT-1 passing through the first insulating layer 10, the second insulating layer 20, and the third insulating layer 30.

A fourth insulating layer 40 may be located on the third insulating layer 30. The fourth insulating layer 40 may be a single-layer silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be located on the fifth insulating layer 50 to cover the second connection electrode CNE2. The sixth insulating layer 60 may be an organic layer.

The light-emitting element layer 130 may be located on the circuit layer 120. The light-emitting element layer 130 may include the light-emitting element 100PE. For example, the light-emitting element layer 130 may include an organic light-emitting material, an inorganic light-emitting material, an organic-inorganic light-emitting material, a quantum dot, a quantum rod, a micro-LED, or a nano-LED. Hereinafter, it will be described that the light-emitting element 100PE is an organic light-emitting element, but the present disclosure is not particularly limited thereto.

The light-emitting element 100PE may include a first electrode AE, a light-emitting layer EL, and a second electrode CE.

The first electrode AE may be located on the sixth insulating layer 60. The first electrode AE may be connected to the second connection electrode CNE2 through a contact hole CNT-3 passing through the sixth insulating layer 60.

A pixel-defining film 70 may be located on the sixth insulating layer 60, and may cover a portion of the first electrode AE. An opening 70-OP is defined in the pixel-defining film 70. The opening 70-OP of the pixel-defining film 70 exposes at least a portion of the first electrode AE.

The active area AA (see FIG. 2) may include a light-emitting area PXA, and a non-light-emitting area NPXA adjacent to the light-emitting area PXA. The non-light-emitting area NPXA may surround the light-emitting area PXA. In one or more embodiments, the light-emitting area PXA is defined to correspond to a partial area of the first electrode AE, which is exposed by the opening 70-OP.

The light-emitting layer EL may be located on the first electrode AE. The light-emitting layer EL may be located in an area corresponding to the opening 70-OP. That is, the light-emitting layers EL may be formed separately from the respective pixels. When the light-emitting layers EL are formed separately from the respective pixels, each of the light-emitting layers EL may emit a light having at least one of a blue color, a red color, or a green color. However, the present disclosure is not limited thereto, and the light-emitting layer EL may be connected to the pixels and may be provided commonly. In this case, the light-emitting layer EL may also provide a blue light or a white light.

The second electrode CE may be located on the light-emitting layer EL. The second electrode CE may have an integral shape, and may be located in the plurality of pixels in common.

In one or more embodiments, a hole control layer may be located between the first electrode AE and the light-emitting layer EL. The hole control layer may be commonly located in the light-emitting area PXA and the non-light-emitting area NPXA. The hole control layer may include a hole transport layer, and may further include a hole injection layer. An electron control layer may be located between the light-emitting layer EL and the second electrode CE. The electron control layer may include an electron transport layer, and may further include an electron injection layer. The hole control layer and the electron control layer may be commonly formed in the plurality of pixels by using an open mask.

The encapsulation layer 140 may be located on the light-emitting element layer 130. The encapsulation layer 140 may include an inorganic layer, an organic layer, and an inorganic layer that are sequentially stacked, and layers constituting the encapsulation layer 140 are not limited thereto. The inorganic layers may protect the light-emitting element layer 130 from moisture and oxygen, and the organic layer may protect the light-emitting element layer 130 from foreign substances, such as dust particles. The inorganic layers may include a silicon nitride layer, a silicon oxy nitride layer, a silicon oxide layer, a titanium oxide layer, an aluminum oxide layer or the like. The organic layer may include an acryl-based organic layer, and the present disclosure is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxy nitride, or silicon oxide. Alternatively, the base layer 201 may be an organic layer including an epoxy resin, an acrylic resin, or an imide-based resin. The base layer 201 may have a single-layer structure, or may have a multi-layer structure in which layers are laminated in the third direction DR3.

Each of the first conductive layer 202 and the second conductive layer 204 may have a single-layer structure, or may have a multi-layer structure in which layers are laminated in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer, such as poly(3,4-ethylenedioxythiophene) (PEDOT), metal nanowire, graphene, or the like.

The conductive layer having a multi-layer structure may include metal layers. The metal layers may have, for example, a three-layer structure of titanium/aluminum/titanium. The conductive layer having a multi-layer structure may include at least one metal layer and at least one transparent conductive layer.

At least one of the sensing insulating layer 203 and the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulating layer 203 and the cover insulating layer 205 may include an organic film. The organic film may include at least one of an acryl-based resin, a methacrylate-based resin, a polyisoprene-based resin, a vinyl-based resin, an epoxy-based resin, an urethane-based resin, a cellulose-based resin, a siloxane-based resin, a polyimide-based resin, a polyamide-based resin, or a perylene-based resin.

Figure 5:
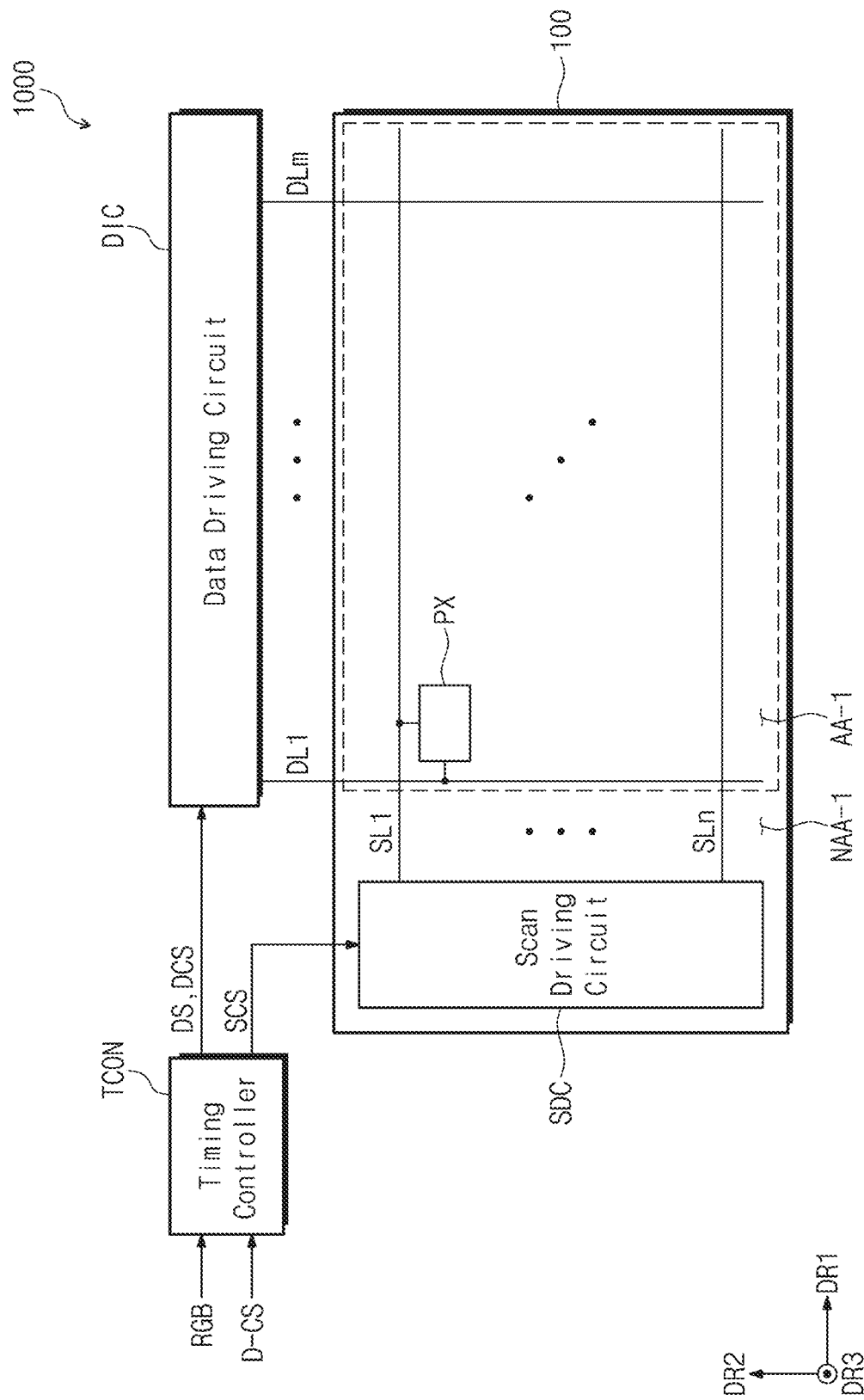
FIG. 5 is a block diagram illustrating a portion of the electronic device according to one or more embodiments of the present disclosure.

FIG. 5 is a block diagram illustrating a portion of the electronic device according to one or more embodiments of the present disclosure.

Referring to FIG. 5, the electronic device 1000 may include the display layer 100, the timing controller TCON, and the data-driving circuit DIC. The data-driving circuit DIC of FIG. 5 may be one of the data-driving circuits DIC (see FIG. 2) illustrated in FIG. 2.

The timing controller TCON may receive input data RGB and a control signal D-CS from a processor. The external controller may include a graphic processing unit. The control signal D-CS may include various signals. For example, the control signal D-CS may include an input vertical synchronization signal, an input horizontal synchronization signal, a main clock, a data enable signal, and the like.

The timing controller TCON may generate image data DS obtained by converting a data format of the input data RGB to satisfy interface specifications with the data-driving circuit DIC.

The timing controller TCON may generate a scan control signal SCS and a data control signal DCS based on the control signal D-CS.

The data-driving circuit DIC may output grayscale voltages for a plurality of data wiring lines DL1 to DLm in response to the data control signal DCS and the image data DS from the timing controller TCON. The data-driving circuit DIC may be implemented as an integrated circuit, and may be electrically connected to the display layer 100 while being directly mounted on an area (e.g., predetermined area) of the display layer 100, or while being mounted on a separate printed circuit board in a chip-on-film (COF) method, but the present disclosure is not limited thereto. For example, the data-driving circuit DIC may be formed through the same process as that of a circuit layer in the display layer 100.

A display area AA-1 and a non-display area NAA-1 may be defined in the display layer 100. A plurality of pixels PX may be arranged in the display area AA-1, and a scan driver (e.g., scan-driving circuit) SDC may be arranged in the non-display area NAA-1. The display area AA-1 may overlap the active area AA (see FIG. 2) of the electronic device 1000, and the non-display area NAA-1 may overlap the non-active area NAA (see FIG. 2) of the electronic device 1000.

The display layer 100 may include a plurality of scan wiring lines SL1 to SLn, the plurality of data wiring lines DL1 to DLm, the plurality of pixels PX, and the scan driver SDC. Each of the plurality of pixels PX may be connected to a corresponding data wiring line among the plurality of data wiring lines DL1 to DLm, and may be connected to a corresponding scan wiring line among the plurality of scan wiring lines SL1 to SLn. In one or more embodiments of the present disclosure, the display layer 100 may further include light-emitting control wiring lines, and the electronic device 1000 may further include a light-emitting driving circuit that provides control signals to the light-emitting control wiring lines. A configuration of the display layer 100 is not particularly limited.

Each of the plurality of scan wiring lines SL1 to SLn may extend parallel to the first direction DR1. The plurality of scan wiring lines SL1 to SLn may be spaced apart from each other in the second direction DR2. Each of the plurality of data wiring lines DL1 to DLm may extend parallel to the second direction DR2 from the data-driving circuit DIC. The plurality of data wiring lines DL1 to DLm may be spaced apart from each other in the first direction DR1.

The plurality of pixels PX may be electrically connected to the plurality of scan wiring lines SL1 to SLn and the plurality of data wiring lines DL1 to DLm. For example, the pixels in a first row may be connected to the scan wiring line SL1, and the pixels in a first column may be connected to the data line DL1.

The scan driver SDC may drive the plurality of scan wiring lines SL1 to SLn in response to the scan control signal SCS. In one or more embodiments of the present disclosure, the scan driver SDC may be formed through the same process as that of a circuit layer in the display layer 100, but the present disclosure is not limited thereto. For example, the scan driver SDC is implemented as an integrated circuit (IC), and may be electrically connected to the display layer 100 while being directly mounted on an area (e.g., predetermined area) of the display layer 100, or while being mounted on a separate printed circuit board in a COF method.

Figure 6:
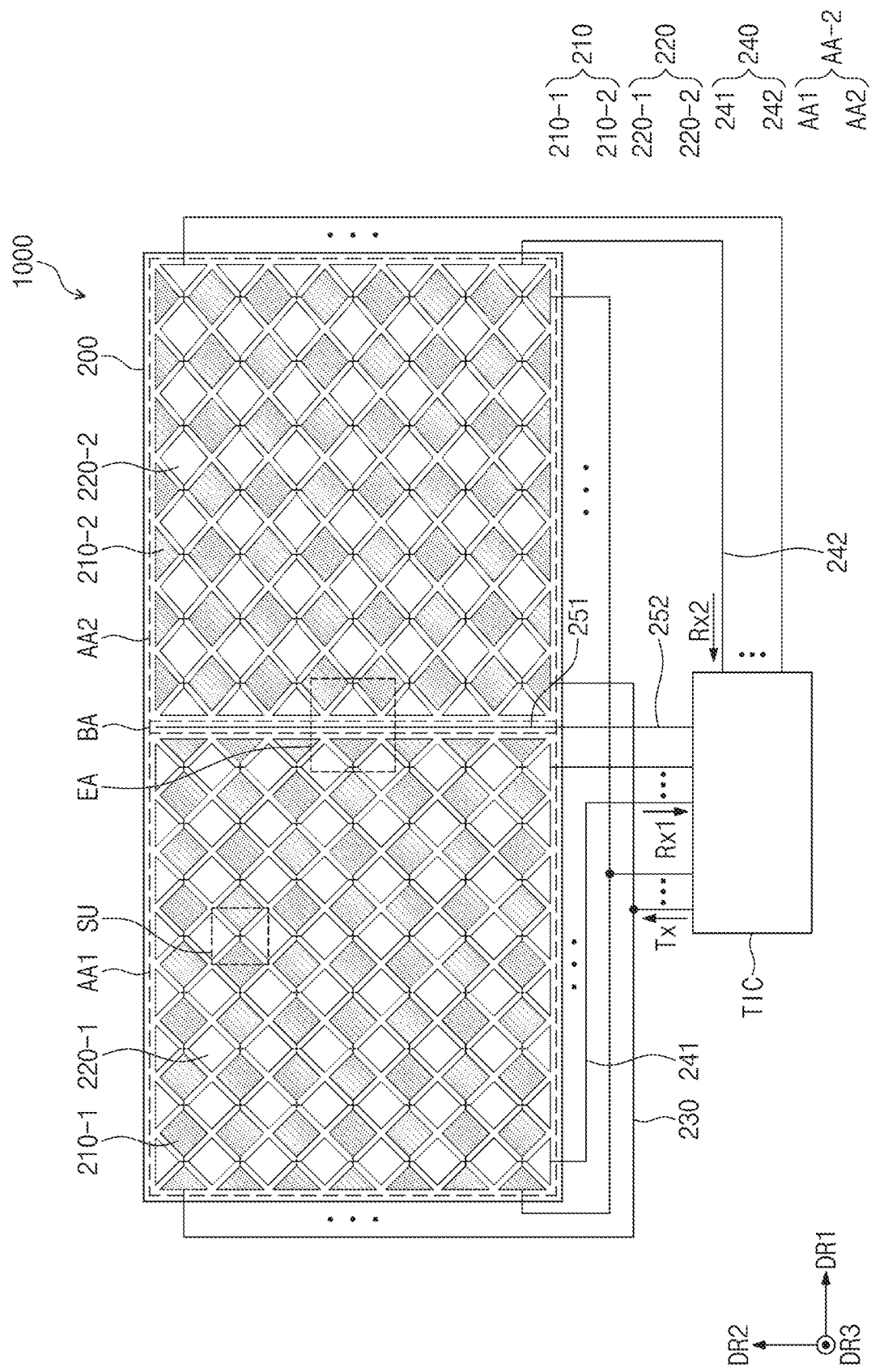
FIG. 6 is a block diagram illustrating a portion of the electronic device according to one or more embodiments of the present disclosure.

FIG. 6 is a block diagram illustrating a portion of the electronic device according to one or more embodiments of the present disclosure.

Referring to FIG. 6, the electronic device 1000 may include the sensor layer 200 and the sensor driver TIC.

A sensing area AA-2 may be defined in the sensor layer 200. The sensing area AA-2 may be an area that is activated according to an electrical signal. The sensing area AA-2 may be an area that senses an input. The sensing area AA-2 may overlap the active area AA (see FIG. 2) of the electronic device 1000, and may overlap the display area AA-1 (see FIG. 5) of the display layer 100 (see FIG. 5).

The sensing area AA-2 may include a first area AA1, a second area AA2, and a boundary area BA. The second area AA2 may be spaced apart from the first area AA1 in the first direction DR1. The boundary area BA may be located between the first area AA1 and the second area AA2. Areas of the first area AA1 and the second area AA2 may be the same.

The sensor layer 200 may include a plurality of electrodes 210 and 220, a plurality of first lines 230, a plurality of second lines 240, a guard electrode 251, and a guard line 252. The plurality of electrodes 210 and the guard electrode 251 may be arranged in the sensing area AA-2.

The plurality of electrodes 210 and 220 may include the plurality of first electrodes 210 and the plurality of second electrodes 220. The sensor layer 200 may acquire information on an external input through a change in a capacitance between the plurality of first electrodes 210 and the plurality of second electrodes 220.

The plurality of first electrodes 210 may include a plurality of $(1\text{-}1)^{th}$ electrodes 210-1 and a plurality of $(1\text{-}2)^{th}$ electrodes 210-2.

The plurality of $(1\text{-}1)^{th}$ electrodes 210-1 may be arranged in the first area AA1. Each of the plurality of $(1\text{-}1)^{th}$ electrodes 210-1 may extend in the first direction DR1. The plurality of $(1\text{-}1)^{th}$ electrodes 210-1 may be arranged in the second direction DR2.

The plurality of $(1\text{-}2)^{th}$ electrodes 210-2 may be arranged in the second area AA2. Each of the plurality of $(1\text{-}2)^{th}$ electrodes 210-2 may extend in the second direction DR2. The plurality of $(1\text{-}2)^{th}$ electrodes 210-2 may be arranged in the first direction DR1.

A size of each of the plurality of $(1\text{-}1)^{th}$ electrodes 210-1 may be different from a size of each of the plurality of $(1\text{-}2)^{th}$ electrodes 210-2. For example, a maximum width of each of the plurality of $(1\text{-}1)^{th}$ electrodes 210-1 in the second direction DR2 may be less than a maximum width of each of the plurality of $(1\text{-}2)^{th}$ electrodes 210-2 in the first direction DR1. Further, a width of each of the plurality of $(1\text{-}1)^{th}$ electrodes 210-1 in the first direction DR1 may be greater than a width of each of the plurality of $(1\text{-}2)^{th}$ electrodes 210-2 in the second direction DR2.

The number of the plurality of $(1\text{-}1)^{th}$ electrodes 210-1 may be the same as the number of the plurality of $(1\text{-}2)^{th}$ electrodes 210-2. That is, the number of channels of the plurality of $(1\text{-}1)^{th}$ electrodes 210-1 may be the same as the number of channels of the plurality of $(1\text{-}2)^{th}$ electrodes 210-2. FIG. 6 illustrates eight $(1\text{-}1)^{th}$ electrodes 210-1 and eight $(1\text{-}2)^{th}$ electrodes 210-2, but the numbers of the plurality of $(1\text{-}1)^{th}$ electrodes 210-1 and the plurality of $(1\text{-}2)^{th}$ electrodes 210-2 according to one or more embodiments of the present disclosure are not limited thereto. For example, the numbers of the plurality of $(1\text{-}1)^{th}$ electrodes 210-1 and the plurality of $(1\text{-}2)^{th}$ electrodes 210-2 may be 35.

The plurality of second electrodes 220 may include a plurality of $(2\text{-}1)^{th}$ electrodes 220-1 and a plurality of $(2\text{-}2)^{th}$ electrodes 220-2.

The plurality of $(2\text{-}1)^{th}$ electrodes 220-1 may be arranged in the first area AA1. The plurality of $(2\text{-}1)^{th}$ electrodes 220-1 may be insulated from, and may cross, the plurality of $(1\text{-}1)^{th}$ electrodes 210-1. Each of the plurality of $(2\text{-}1)^{th}$ electrodes 220-1 may extend in the second direction DR2. The plurality of $(2\text{-}1)^{th}$ electrodes 220-1 may be arranged in the first direction DR1.

The plurality of $(2\text{-}2)^{th}$ electrodes 220-2 may be arranged in the second area AA2. The plurality of $(2\text{-}2)^{th}$ electrodes 220-2 may be insulated from, and may cross, the plurality of $(1\text{-}2)^{th}$ electrodes 210-2. Each of the plurality of $(2\text{-}2)^{th}$ electrodes 220-2 may extend in the first direction DR1. The plurality of $(2\text{-}2)^{th}$ electrodes 220-2 may be arranged in the second direction DR2.

A size of each of the plurality of $(2\text{-}1)^{th}$ electrodes 220-1 may be different from a size of each of the plurality of $(2\text{-}2)^{th}$ electrodes 220-2.

The number of the plurality of $(2\text{-}1)^{th}$ electrodes 220-1 may be different from the number of the plurality of $(2\text{-}2)^{th}$ electrodes 220-2. For example, the number of the plurality of $(2\text{-}1)^{th}$ electrodes 220-1 may be greater than the number of the plurality of $(2\text{-}2)^{th}$ electrodes 220-2. FIG. 6 illustrates eight $(2\text{-}1)^{th}$ electrodes 220-1 and seven $(2\text{-}2)^{th}$ electrodes 220-2, but the numbers of the plurality of $(2\text{-}1)^{th}$ electrodes 220-1 and the plurality of $(2\text{-}2)^{th}$ electrodes 220-2 according to one or more embodiments of the present disclosure are not limited thereto. For example, the number of the plurality of $(2\text{-}1)^{th}$ electrodes 220-1 may be 40, and the number of the plurality of $(2\text{-}2)^{th}$ electrodes 220-2 may be 35.

FIG. 6 illustrates the plurality of electrodes 210 having an 8×7 array in the first area AA1 and illustrates the plurality of electrodes 210 having a 7×7 array in the second area AA2, but the present disclosure is not limited thereto, and the plurality of electrodes 210 may be variously provided as long as the number of row channels in the first area AA1 and the number of column channels in the second area AA2 are the same.

The plurality of first lines 230 may be electrically connected to the sensor driver TIC. The plurality of first lines 230 may overlap the non-active area NAA (see FIG. 2) when viewed on a plane.

Each of the plurality of first lines 230 may be connected to a corresponding one of the plurality of $(1\text{-}1)^{th}$ electrodes 210-1 and a corresponding one of the plurality of $(1\text{-}2)^{th}$ electrodes 210-2. For example, the first one of the first lines 230 may be connected to the first $(1\text{-}1)^{th}$ electrode 210-1 and the first $(1\text{-}2)^{th}$ electrode 210-2, and the second one of the first lines 230 may be connected to the second $(1\text{-}1)^{th}$ electrode 210-1 and the second $(1\text{-}2)^{th}$ electrode 210-2.

The plurality of $(1\text{-}1)^{th}$ electrodes 210-1 and the plurality of $(1\text{-}2)^{th}$ electrodes 210-2 may be electrically connected by the plurality of first lines 230. For example, the first $(1\text{-}1)^{th}$ electrode 210-1 and the first $(1\text{-}2)^{th}$ electrode 210-2 may be electrically connected to each other, and the second $(1\text{-}1)^{th}$ electrode 210-1 and the second $(1\text{-}2)^{th}$ electrode 210-2 may be electrically connected to each other.

The plurality of second lines 240 may be electrically connected to the sensor driver TIC. The plurality of second lines 240 may be electrically connected to the plurality of second electrodes 220, respectively. The plurality of second lines 240 may overlap the non-active area NAA (see FIG. 2) when viewed on a plane. The plurality of second lines 240 may include a plurality of $(2\text{-}1)^{th}$ lines 241 and a plurality of $(2\text{-}2)^{th}$ lines 242.

The plurality of $(2\text{-}1)^{th}$ lines 241 may be electrically connected to the plurality of $(2\text{-}1)^{th}$ electrodes 220-1, respectively.

The plurality of $(2\text{-}2)^{th}$ lines 242 may be electrically connected to the plurality of $(2\text{-}2)^{th}$ electrodes 220-2, respectively.

The guard electrode 251 may be located in the boundary area BA. The guard electrode 251 may be spaced apart from the plurality of first electrodes 210 and the plurality of second electrodes 220. The guard line 252 may be connected to the guard electrode 251. The guard line 252 may be electrically connected to the sensor driver TIC.

The sensor driver TIC may sequentially output a sensing signal Tx to the plurality of first lines 230. The sensor driver TIC may provide the same sensing signal Tx to the first $(1\text{-}1)^{th}$ electrode 210-1 of the plurality of $(1\text{-}1)^{th}$ electrodes 210-1 and to the first $(1\text{-}2)^{th}$ electrode 210-2 of the plurality of $(1\text{-}2)^{th}$ electrodes 210-2. For example, the same sensing signal Tx may be provided to the first $(1\text{-}1)^{th}$ electrode 210-1 and to the first $(1\text{-}2)^{th}$ electrode 210-2, and the same sensing signal Tx may be provided to the second $(1\text{-}1)^{th}$ electrode 210-1 and to the second $(1\text{-}2)^{th}$ electrode 210-2.

That is, the same sensing signal Tx may be provided to one of the plurality of $(1\text{-}1)^{th}$ electrodes 210-1 and to one of the plurality of $(1\text{-}2)^{th}$ electrodes 210-2 through the plurality of first lines 230.

The sensor driver TIC may calculate input coordinate information based on reception signals Rx1 and Rx2 received from each of the plurality of second lines 240.

The reception signals Rx1 and Rx2 may include the first reception signal Rx1 and the second reception signal Rx2.

The first reception signal Rx1 may be output from the plurality of $(2\text{-}1)^{th}$ electrodes 220-1. The first reception signal Rx1 may be generated based on the sensing signal Tx provided by the plurality of $(1\text{-}1)^{th}$ electrodes 210-1. The sensor driver TIC may calculate coordination information of the first area AA1 based on the first reception signal Rx1.

The second reception signal Rx2 may be output from the plurality of $(2\text{-}2)^{th}$ electrodes 220-2. The second reception signal Rx2 may be generated based on the sensing signal Tx provided by the plurality of $(1\text{-}2)^{th}$ electrodes 210-2. The sensor driver TIC may calculate coordination information of the second area AA2 based on the second reception signal Rx2.

Unlike the present disclosure, the electronic device 1000 constituting a vehicle dashboard may have a relatively large active area AA (see FIG. 2). In this case, the number of electrodes of the sensor layer 200 increases, and thus it may be difficult to drive the electrodes through a single sensor driver. However, according to the present disclosure, the sensor layer 200 may include the plurality of $(1-1)^{th}$ electrodes 210-1 and the plurality of $(1-2)^{th}$ electrodes 210-2 extending along the areas AA1 and AA2 in different directions, and also may include the plurality of first lines 230 commonly connected to the plurality of $(1-1)^{th}$ electrodes 210-1 and the plurality of $(1-2)^{th}$ electrodes 210-2, and the sensor driver TIC may transmit the same sensing signal Tx to a pair corresponding to the plurality of $(1-1)^{th}$ electrodes 210-1 and the plurality of $(1-2)^{th}$ electrodes 210-2 through the plurality of first lines 230, and may calculate coordinate information based on the received reception signals Rx1 and Rx2. The number of sensing signals Tx suitable to sense an external input in the sensing area AA-2 may be relatively reduced. Through a configuration that transmits the same sensing signal Tx, the number of channels that transmit the sensing signal Tx may be reduced by half, and the sensor layer 200 may be driven using one sensor driver TIC. Thus, the electronic device 1000 having a reduced area of the non-active area NAA (see FIG. 2) may be provided.

Further, according to the present disclosure, electrodes arranged in the first area AA1 and the second area AA2 may be electrically insulated from each other through the guard electrode 251. A ghost touch phenomenon that may occur when the sensing area AA-2 is not electrically insulated and separated may be eliminated, reduced, or prevented. The sensor driver TIC may transmit the same sensing signal Tx to the plurality of $(1-1)^{th}$ electrodes 210-1 of the first area AA1 and to the plurality of $(1-2)^{th}$ electrodes 210-2 of the second area AA2, and may separately receive the first reception signal Rx1 for the first area AA1 and the second reception signal Rx2 for the second area AA2. Thus, the electronic device 1000 having improved touch reliability may be provided.

Figure 7:
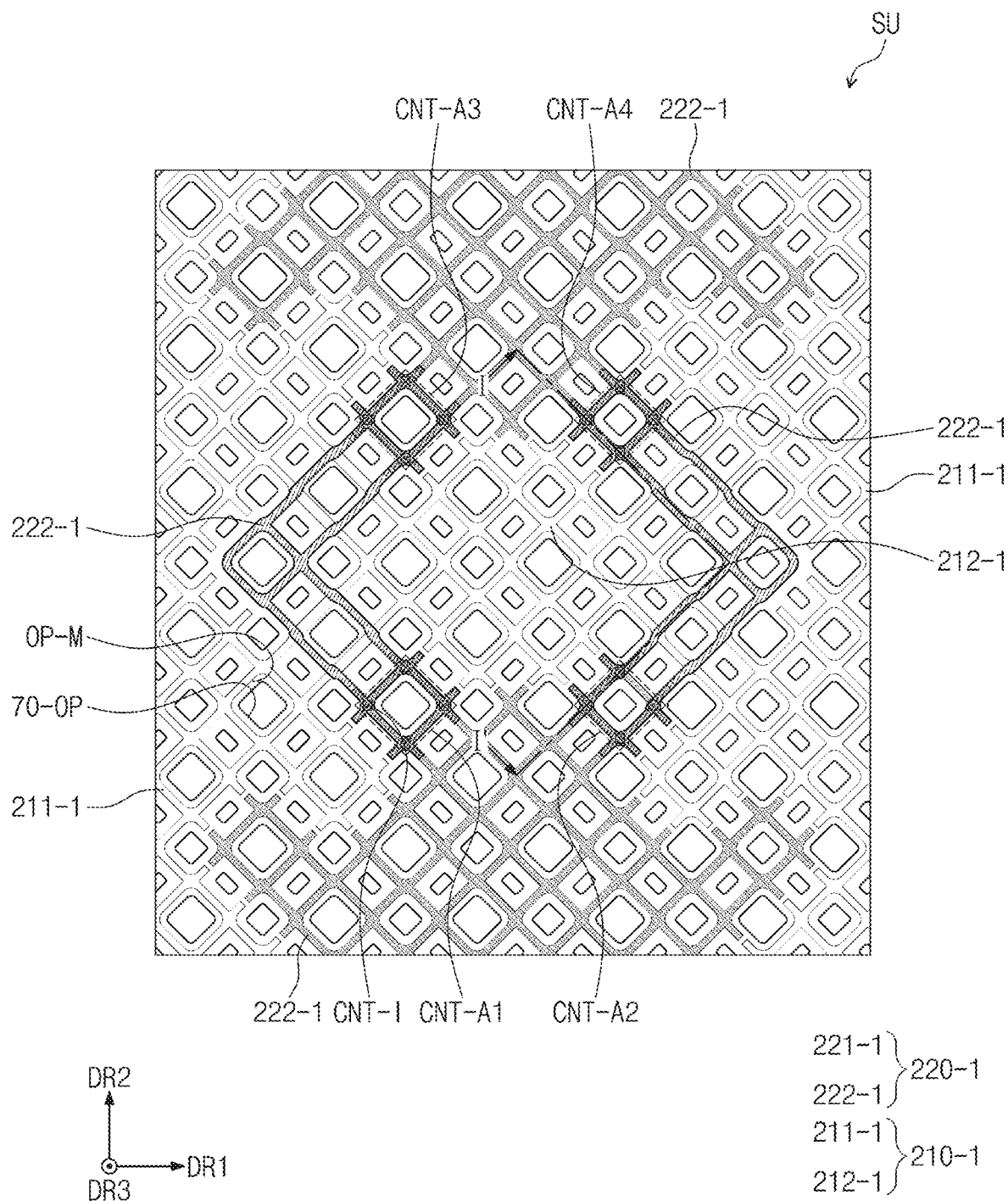
FIG. 7 is an enlarged plan view illustrating one area of FIG. 6 according to one or more embodiments of the present disclosure.

FIG. 7 is an enlarged plan view illustrating one area of FIG. 6 according to one or more embodiments of the present disclosure. In the description of FIG. 7, the components described through FIG. 6 are designated by the same reference numerals, and a description thereof will be omitted.

Referring to FIG. 7, an intersection area SU may be an area in which bridge patterns 222-1 are arranged.

Each of the plurality of $(1-1)^{th}$ electrodes 210-1 may include a first part 211-1 and a second part 212-1. The first part 211-1 and the second part 212-1 may have an integrated shape.

Each of the plurality of $(2-1)^{th}$ electrodes 220-1 may include a sensing pattern 221-1 and the bridge pattern 222-1. The two adjacent sensing patterns 221-1 may be electrically connected to each other by the two bridge patterns 222-1, but the present disclosure is not limited thereto. The sensing pattern 221-1 may have a mesh structure. An opening OP-M may be defined in the sensing pattern 221-1. The one opening OP-M may overlap the opening 70-OP defined in the pixel-defining film 70 (see FIG. 4). However, this is merely an example, and the one opening OP-M may overlap the plurality of openings 70-OP. Each of the bridge pattern 222-1, the first part 211-1, and the second part 212-1 may also have a mesh structure similar to the sensing pattern 221-1.

The two bridge patterns 222-1 may connect the two sensing patterns 221-1. First to fourth connection areas CNT-A1, CNT-A2, CNT-A3, and CNT-A4 may be provided between the two bridge patterns 222-1 and the two sensing patterns 221-1. Four contact holes CNT-I may be formed in the first to fourth connection areas CNT-A1 to CNT-A4, respectively. However, this is merely an example, and the two sensing patterns 221-1 may be also electrically connected by the one bridge pattern. Further, in one or more embodiments of the present disclosure, the two sensing patterns 221-1 may be electrically connected by the three or more bridge patterns.

FIG. 7 illustrates the plurality of $(1-1)^{th}$ electrodes 210-1 and the plurality of $(2-1)^{th}$ electrodes 220-1, but the $(1-2)^{th}$ electrodes 210-2 and the plurality of $(2-2)^{th}$ electrodes 220-2 may have similar structures.

Figure 8:
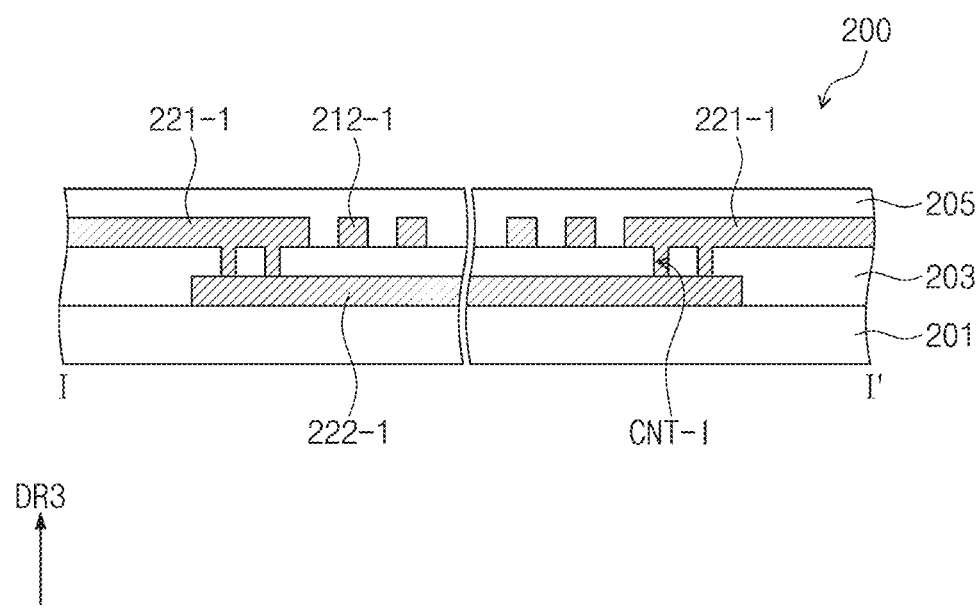
FIG. 8 is a cross-sectional view of a sensor layer along the line I-I' of FIG. 7 according to one or more embodiments of the present disclosure.

FIG. 8 is a cross-sectional view of a sensor layer along the line I-I' of FIG. 7 according to one or more embodiments of the present disclosure. In the description of FIG. 8, the components described through FIGS. 4 and 7 are designated by the same reference numerals, and a description thereof will be omitted.

Referring to FIG. 8, the sensor layer 200 may have a bottom bridge structure. For example, the bridge pattern 222-1 may be included in the first conductive layer 202 (see FIG. 4), and the first part 211-1 (see FIG. 7), the second part 212-1, and the sensing pattern 221-1 may be included in the second conductive layer 204 (see FIG. 4).

The bridge pattern 222-1 may be located on the base layer 201.

The sensing insulating layer 203 may be located on the bridge pattern 222-1.

The sensing insulating layer 203 may cover the bridge pattern 222-1.

The first part 211-1 (see FIG. 7), the second part 212-1, and the sensing pattern 221-1 may be arranged on the sensing insulating layer 203. The first part 211-1 (see FIG. 7), the second part 212-1, and the sensing pattern 221-1 may be provided on the same layer.

The sensing pattern 221-1 may be connected to the bridge pattern 222-1 through a contact hole CNT-I passing through the sensing insulating layer 203.

The cover insulating layer 205 may be located on the first part 211-1 (see FIG. 7), the second part 212-1, and the sensing pattern 221-1. The cover insulating layer 205 may cover the first part 211-1 (see FIG. 7), the second part 212-1, and the sensing pattern 221-1.

Figure 9:
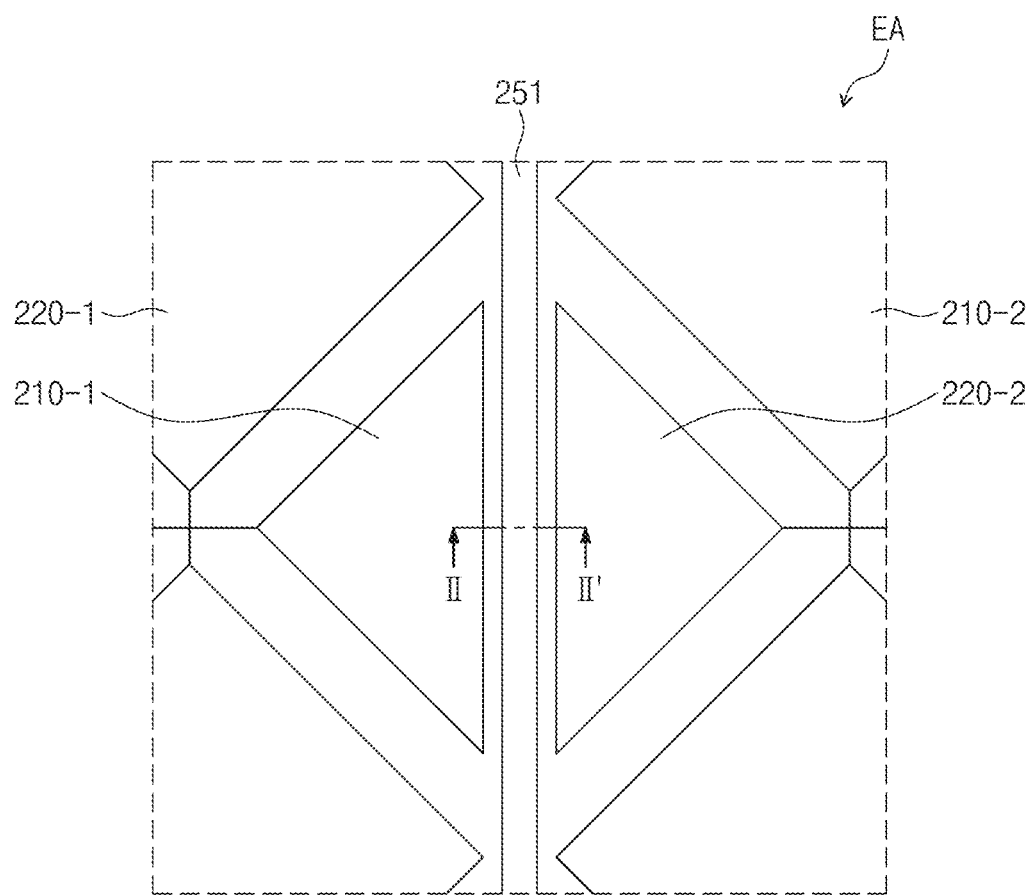
FIG. 9 is an enlarged plan view illustrating the one area of FIG. 6 according to one or more embodiments of the present disclosure.
Figure 10:
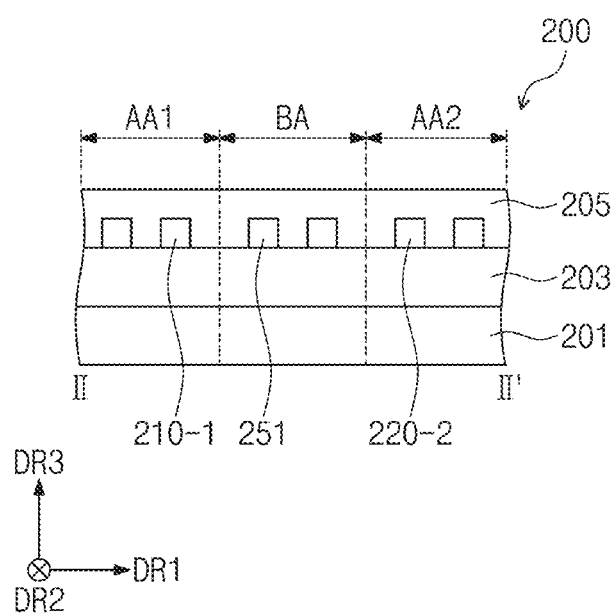
FIG. 10 is a cross-sectional view along the line II-II' of FIG. 9 according to one or more embodiments of the present disclosure.

FIG. 9 is an enlarged plan view illustrating the one area of FIG. 6 according to one or more embodiments of the present disclosure, and FIG. 10 is a cross-sectional view along the line II-II' of FIG. 9 according to one or more embodiments of the present disclosure. In the description of FIG. 9, the components described through FIG. 6 are designated by the same reference numerals, and a description thereof will be omitted.

Referring to FIGS. 9 and 10, an intermediate area EA may be an area in which the guard electrode 251 is located.

The guard electrode 251 may be located in the boundary area BA (see FIG. 6). The guard electrode 251 may extend in the second direction DR2. The guard electrode 251 may have a mesh structure.

The guard electrode 251 may be located between the plurality of $(1-1)^{th}$ electrodes 210-1 and the plurality of $(2-2)^{th}$ electrodes 220-2. The guard electrode 251 may be located between the plurality of $(2-1)^{th}$ electrodes 220-1 and the plurality of $(1-2)^{th}$ electrodes 210-2.

A ground voltage or a guard voltage may be provided to the guard electrode 251 through the guard line 252, or the guard electrode 251 may be in a floating state.

The ground voltage may have a different voltage level from the guard voltage. The guard electrode 251 may electrically insulate the first area AA1 and the second area AA2.

The guard electrode 251 may be located on the sensing insulating layer 203. The guard electrode 251 may be at the same layer as the $(1-1)^{th}$ electrode 210-1. The guard electrode 251 may be at the same layer as at least a portion of the $(2-2)^{th}$ electrode 220-2.

According to the present disclosure, the sensor driver TIC may transmit the same sensing signal Tx to the plurality of $(1-1)^{th}$ electrodes 210-1 of the first area AA1 and the plurality of $(1-2)^{th}$ electrodes 210-2 of the second area AA2, and may separately receive the first reception signal Rx1 for the first area AA1 and the second reception signal Rx2 for the second area AA2. A ghost touch phenomenon that may occur when the sensing area AA-2 is not electrically insulated and separated may be reduced, eliminated, or prevented. Thus, the electronic device 1000 having improved touch reliability may be provided.

Figure 11:
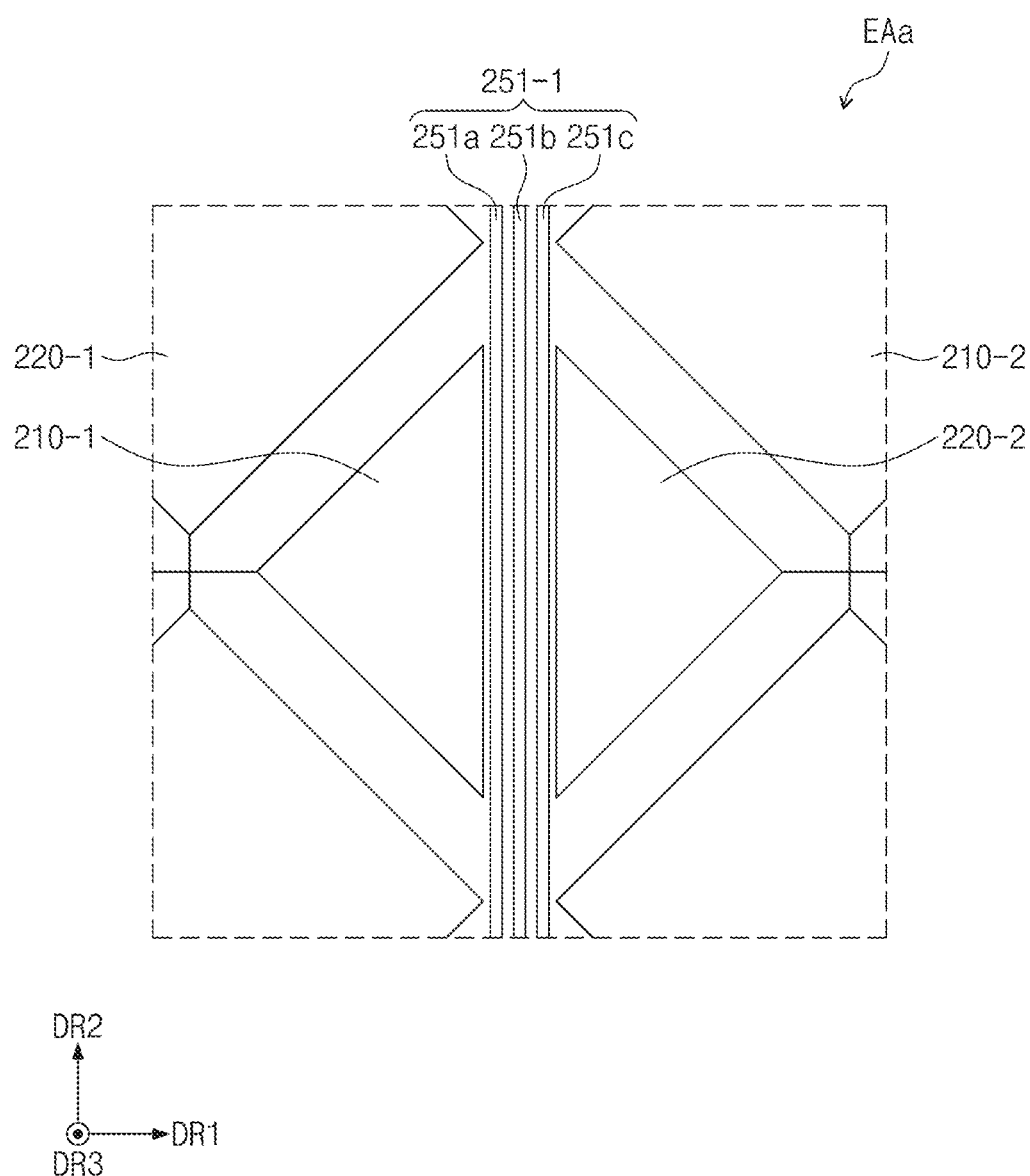
FIG. 11 is an enlarged plan view illustrating an area corresponding to the one area of FIG. 6 according to one or more embodiments of the present disclosure.

FIG. 11 is an enlarged plan view illustrating an area corresponding to the one area of FIG. 6 according to one or more embodiments of the present disclosure. In the description of FIG. 11, the components described through FIG. 9 are designated by the same reference numerals, and a description thereof will be omitted.

Referring to FIG. 11, an intermediate area EAa may be an area in which a guard electrode 251-1 is located.

The guard electrode 251-1 may be located in the boundary area BA (see FIG. 9). The guard electrode 251-1 may be located between the plurality of $(1-1)^{th}$ electrodes 210-1 and the plurality of $(2-2)^{th}$ electrodes 220-2. The guard electrode 251 may be located between the plurality of $(2-1)^{th}$ electrodes 220-1 and the plurality of $(1-2)^{th}$ electrodes 210-2.

The guard electrode 251-1 may include a first sub-guard 251a, a second sub-guard 251b, and a third sub-guard 251c arranged in the first direction DR1. Each of the first sub-guard 251a, the second sub-guard 251b, and the third sub-guard 251c may extend in the second direction DR2.

The second sub-guard 251b may be located between the first sub-guard 251a and the third sub-guard 251c. A voltage provided to the first sub-guard 251a and the third sub-guard 251c may be different from a voltage provided to the second sub-guard 251b. That is, voltage levels of the first sub-guard 251a and the second sub-guard 251b may be different from each other, and voltage levels of the first sub-guard 251a and the third sub-guard 251c may be the same.

For example, the ground voltage may be provided to the second sub-guard 251b, and the guard voltage having a voltage level that is different from the ground voltage may be provided to the first sub-guard 251a and the third sub-guard 251c. Alternatively, the guard voltage may be provided to the second sub-guard 251b, and the ground voltage may be provided to the first sub-guard 251a and the third sub-guard 251c. However, this is merely an example, and the voltages provided to the first sub-guard 251a, the second sub-guard 251b, and the third sub-guard 251c according to one or more embodiments of the present disclosure are not limited thereto and may be variously provided.

According to the above description, a sensor driver may transmit the same sensing signal to a plurality of $(1-1)^{th}$ electrodes of a first area and a plurality of $(1-2)^{th}$ electrodes of a second area, and may separately receive a first reception signal for the first area and a second reception signal for the second area. A ghost touch phenomenon that may occur when a sensing area is not electrically insulated and separated may be reduced, eliminated, or prevented. Thus, an electronic device having improved touch reliability may be provided.

Further, according to the above description, a sensor layer may include the plurality of $(1-1)^{th}$ electrodes and the plurality of $(1-2)^{th}$ electrodes extending along in different directions depending on an area and a plurality of first lines commonly connected to the plurality of $(1-1)^{th}$ electrodes and the plurality of $(1-2)^{th}$ electrodes, and the sensor driver may transmit the same sensing signal to a pair corresponding to the plurality of $(1-1)^{th}$ electrodes and the plurality of $(1-2)^{th}$ electrodes through the plurality of first lines, and may calculate coordinate information based on the received reception signals. Through a configuration that transmits the same sensing signal, the number of channels that transmit the sensing signal may be reduced by half, and the sensor layer may be driven using the one sensor driver. Thus, an electronic device in which an area of a non-active area is reduced may be provided.

Although the description has been made above with reference to one or more embodiments of the present disclosure, it may be understood that those skilled in the art or those having ordinary knowledge in the art may variously modify and change the present disclosure without departing from the spirit and technical scope of the present disclosure described in the appended claims. Thus, the technical scope of the present disclosure is not limited to the detailed description of the specification, but should be defined by the appended claims, with functional equivalents thereof to be included therein.

What is claimed is:

1. An electronic device comprising:
  a display layer;
  a sensor layer above the display layer, and defining a sensing area comprising a first area and a second area; and
  a sensor driver configured to drive the sensor layer,
  wherein the sensor layer comprises:
    a $(1-1)^{th}$ electrode in the first area, and extending in a first direction;
    a $(2-1)^{th}$ electrode in the first area, extending in a second direction crossing the first direction, and insulated from and crossing the $(1-1)^{th}$ electrode;
    a $(1-2)^{th}$ electrode in the second area, and extending in the second direction;
    a $(2-2)^{th}$ electrode in the second area, extending in the first direction, and insulated from and crossing the $(1-2)^{th}$ electrode;
    a first line connected to the $(1-1)^{th}$ electrode and to the $(1-2)^{th}$ electrode;
    a $(2-1)^{th}$ line connected to the $(2-1)^{th}$ electrode; and
    a $(2-2)^{th}$ line connected to the $(2-2)^{th}$ electrode.

2. The electronic device of claim 1, wherein the sensing area further comprises a boundary area between the first area and the second area, and
  wherein the sensor layer further comprises a guard electrode in the boundary area.

3. The electronic device of claim 2, wherein the guard electrode is configured to receive a ground voltage.

4. The electronic device of claim 2, wherein the guard electrode is configured to be in a floating state.

5. The electronic device of claim 2, wherein the guard electrode is at a same layer as the $(1-1)^{th}$ electrode.

6. The electronic device of claim 2, wherein the guard electrode comprises a first sub-guard and a second sub-guard arranged in the first direction, and extending in the second direction.

7. The electronic device of claim 6, wherein the first sub-guard and the second sub-guard are configured to receive different respective voltage levels.

8. The electronic device of claim 6, wherein the guard electrode further comprises a third sub-guard spaced from the first sub-guard with the second sub-guard therebetween.

9. The electronic device of claim 8, wherein the first sub-guard and the third sub-guard are configured to receive a voltage that is different from a voltage configured to be received by the second sub-guard.

10. The electronic device of claim 1, wherein the first line, the $(2-1)^{th}$ line, and the $(2-2)^{th}$ line are electrically connected to the sensor driver.

11. The electronic device of claim 1, wherein a size of the $(1-1)^{th}$ electrode is different from a size of the $(1-2)^{th}$ electrode.

12. The electronic device of claim 1, wherein the sensor driver is configured to provide a same sensing signal to the $(1-1)^{th}$ electrode and the $(1-2)^{th}$ electrode through the first line.

13. The electronic device of claim 1, wherein the $(1-1)^{th}$ electrode and the $(1-2)^{th}$ electrode are electrically connected.

14. An electronic device comprising:
a display layer;
a sensor layer above the display layer, and defining a sensing area comprising a first area and a second area; and
a sensor driver configured to drive the sensor layer,
wherein the sensor layer comprises:
  $(1-1)^{th}$ electrodes in the first area, extending in a first direction, and arranged in a second direction crossing the first direction;
  $(2-1)^{th}$ electrodes in the first area, extending in the second direction, and arranged in the first direction;
  $(1-2)^{th}$ electrodes in the second area, extending in the second direction, and arranged in the first direction; and
  $(2-2)^{th}$ electrodes in the second area, extending in the first direction, and arranged in the second direction,
wherein the sensor driver is configured to provide a same sensing signal to a first $(1-1)^{th}$ electrode of the $(1-1)^{th}$ electrodes and a first $(1-2)^{th}$ electrode of the $(1-2)^{th}$ electrodes.

15. The electronic device of claim 14, wherein a number of the $(1-1)^{th}$ electrodes and a number of the $(1-2)^{th}$ electrodes are equal.

16. The electronic device of claim 14 wherein the sensing area further comprises a boundary area between the first area and the second area, and
wherein the sensor layer further comprises a guard electrode in the boundary area.

17. The electronic device of claim 16, wherein the guard electrode is configured to receive a ground voltage.

18. The electronic device of claim 16, wherein the guard electrode is configured to be in a floating state.

19. The electronic device of claim 14, wherein the $(1-1)^{th}$ electrodes and the $(1-2)^{th}$ electrodes are electrically connected.

20. The electronic device of claim 14, wherein a size of the first $(1-1)^{th}$ electrode is different from a size of the first $(1-2)^{th}$ electrode.

* * * * *